Figure 2:
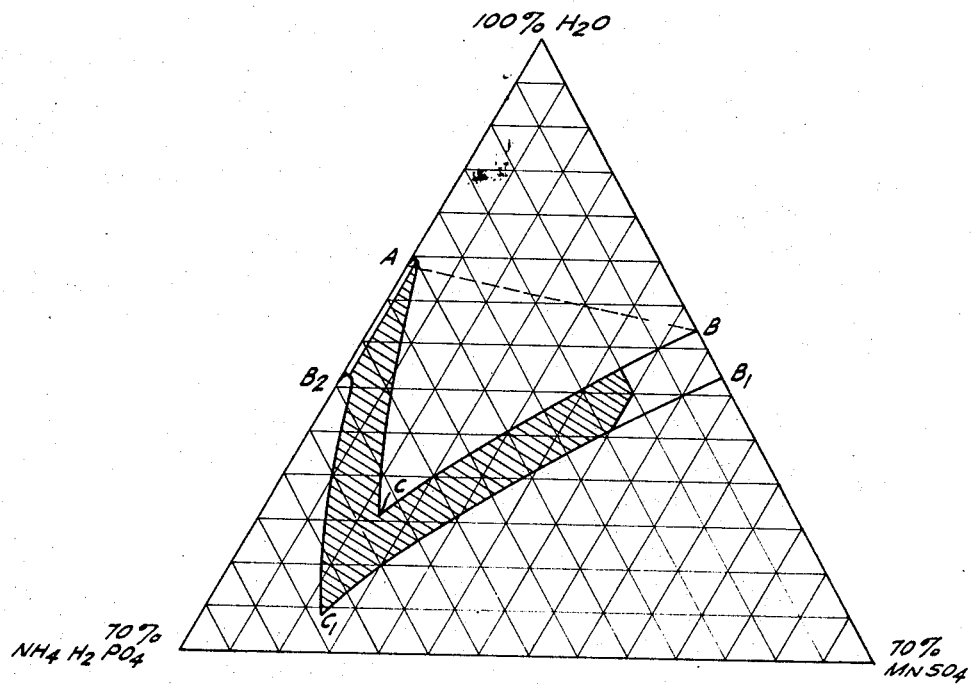

United States Patent

Backlund

[15] 3,660,069
[45] May 2, 1972

[54] MANGANESE NUTRIENT SOLUTION

[72] Inventor: Peter Stanley Backlund, Anaheim, Calif.

[73] Assignee: Union Oil Company of California, Los Angeles, Calif.

[22] Filed: Nov. 12, 1969

[21] Appl. No.: 875,738

[52] U.S. Cl. .................................................71/33, 71/53
[51] Int. Cl. ............................................................C05b 17/02
[58] Field of Search ..........................71/1, 36, 29–33, 71/53, 63, 64 C

[56] References Cited

UNITED STATES PATENTS

| | | |
|---|---|---|
| 2,770,538 | 11/1956 | Vierling..................................71/29 |
| 2,804,382 | 8/1957 | Nikitin et al..............................71/31 |
| 2,823,107 | 2/1958 | Allison.....................................71/32 |
| 2,919,183 | 12/1959 | Christoffer................................71/1 |

*Primary Examiner*—Charles N. Hart
*Attorney*—Milton W. Lee, Richard C. Hartman, Lannas S. Henderson, Dean Sandford and Robert E. Strauss

[57] ABSTRACT

A solution suitable for application to plants and soil to correct manganese deficiencies is described which comprises an aqueous solution of manganese sulfate and mono-potassium or mono-ammonium hydrogen orthophosphate having an acidic pH value from about 1.5 to about 4 and a novel eutectic composition.

8 Claims, 2 Drawing Figures

MANGANESE NUTRIENT SOLUTION

DESCRIPTION OF THE INVENTION

This invention relates to nutrient solutions and in particular relates to manganese-containing nutrient solutions suitable for correction of manganese deficiency in crops and soils.

An often encountered trace metal deficiency in crops or soils is a manganese deficiency. While various solutions have been described for the preparation of manganese-containing solutions for correcting such deficiencies, heretofore, no solution has been described which supplies a mixture of nutrients comprising phosphorus in major quantities with lesser quantities of nitrogen, potassium, or mixtures thereof.

While the manganese-containing solutions of this invention can be used to correct manganese deficiencies at any time, it has been found that the solutions are of particular value in late season application, i.e., 20 to about 45 days prior to harvesting. It has been found that the application of these solutions, particularly those in which phosphorus is present in major proportions, results in greatly enchanced late season growth, particularly when potassium or nitrogen are also present. Accordingly, this invention is directed to such manganese-containing compositions and a method for their preparation.

I have found that mixtures of ammonium or potassium dihydrogen orthophosphate, or mixtures thereof, in admixture with manganese sulfate in aqueous solution, form eutectic compositions having greatly enhanced solubilities of the solids. This enhanced solubility greatly increases the amount of the phosphate, e.g., approximately doubles the solubility of the phosphate in the aqueous solution for any given salting out temperature. This enhanced solubility of a major nutrient in a manganese-containing nutrient solution is significant in that it permits the application of the major nutrient, i.e., phosphorus in substantial quantities to the plant simultaneously with the application of the manganese to correct manganese deficiency.

Figure 1:
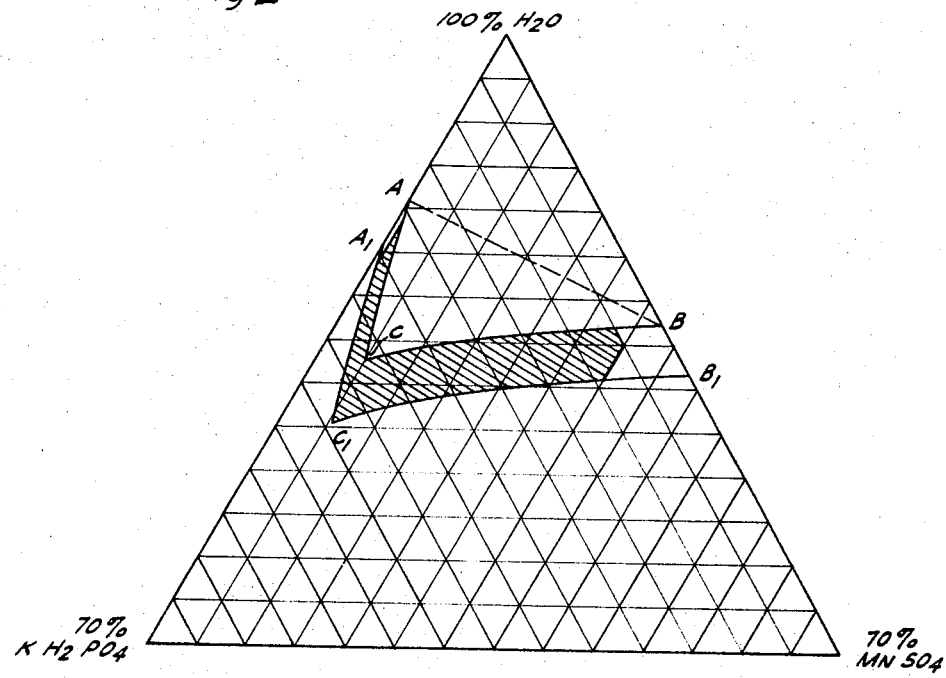

The solutions of this invention will be described by reference to the figures of which:

FIG. 1 is a ternary diagram of the system of mono-potassium orthophosphate, water and manganese sulfate; and FIG. 2 is a ternary diagram for the system of mono-ammonium hydrogen orthophosphate, water and manganese sulfate.

Referring to FIG. 1, it can be seen that the manganese sulfate and mono-potassium hydrogen orthophosphate form eutectic compositions having greatly enhanced solubilities. The system depicted in FIG. 1 represents the system at a pH value of 2; however, this system is substantially identical to the systems having pH values in the range from about 1.5 to about 4 which are encompassed within this invention. As illustrated, the maximum solubility of mono-potassium hydrogen orthophosphate in water is at 0° C. as illustrated by point A as comprising about 18.5 weight percent of the solids. At 20° C. there is a slight increase in solubility to 23 weight percent solute. Similarly, the maximum solubility of manganese sulfate in an aqueous solution at 0° C. is approximately 33 weight percent solute while at 20° C. it is approximately 38 weight percent solute. The broken line A-B connecting the points A and B of the 0° isotherm represents the normally expected solubilities of these salts upon simple admixture of their solutions. Thus, it would be expected, absent any synergistic effect on solubility exhibited by the combination, that the solubilities of the mixtures of the salts would fall along the straight line A-B. Contrary to this expectation, I have found that the combination of salts exhibits a synergistic effect on solubility and the isotherm is substantially depressed, particularly for solutions containing about 3 to 10 weight percent manganese sulfate where, at point C, it can be seen that the potassium hydrogen orthophosphate content of the solution is about 32 weight percent, considerably in excess of its solubility in water. A similar effect can be illustrated at the 20° C. isotherm as represented by points $A_1$; $B_1$ and $C_1$ wherein a solution containing up to 39 weight percent mono-potassium hydrogen orthophosphate is possible without exceeding the 20° C. salting out temperature.

Solutions falling within the scope of this invention therefore comprise those solutions having salting out temperatures no greater than 0° C. and comprising an aqueous solution of manganese sulfate and mono-potassium hydrogen orthophosphate with a pH value from about 1.5 to about 4. These solutions have compositions included within the area defined by lines A-B, B-C and C-A of FIG. 1. Other solutions embraced within the scope of this invention comprise those solutions having from 1 to about 30 weight percent manganese sulfate, from 5 to about 39 weight percent mono-potassium hydrogen orthophosphate and from 56 to about 78 weight percent water, in an amount sufficient to provide a salting out temperature of the solution from 0° C. to about 20° C. These compositions are encompassed within the shaded area defined on FIG. 1. Of the solutions within the scope of the invention, the most preferred are those containing from about 2 to 10 weight percent manganese sulfate with a consequentially high content of mono-potassium orthophosphate.

Referring now to FIG. 2, the ternary system for the mono-ammonium orthophosphate, manganese sulfate and water can be seen. This system, as that previously described, exhibits a eutectic point in solubility, i.e., the solutes exhibit synergistic solubilities. Thus the mono-ammonium orthophosphate has a maximum solubility in an aqueous solution at a pH from about 1.5 to 4 of about 26 weight percent at 0° C. and, at 20° C., approximately 40 weight percent. These points are shown as A and $A_1$ of FIG. 2. As with the previously described system, the solutions encompassed by my invention comprise those solutions contained within the area defined by the lines A-B, $B-B_1$, $B_1-C_1$, $C_1-A_1$ and $A_1-A$. It is these solutions which exhibit an unexpectedly low salting out temperature for any given solute concentration which is lower than the expected salting out temperature if the solutes simply combine additively.

Particularly preferred solutions are those having from 1 to 30 weight percent manganese sulfate, from 10 to 54 weight percent mono-ammonium orthophosphate and from 34 to about 73 weight percent water. These solutions are shown in the shaded area of FIG. 2. Of these solutions and of the solutions within the area A-B-C-A, the most preferred compositions are those having from about 2 to 15 weight percent manganese sulfate with consequentially high contents of mono-ammonium orthophosphate.

Although not separately shown, similar ternary systems occur when the ammonium or potassium dihydrogen orthophosphate solute is replaced with a mixture of both these solutes. Such systems, while being quaternary systems, can be depicted on a tertiary diagram at any constant ratio of the ammonium to the potassium salt and have solubilities intermediate the two extremes shown in FIGS. 1 and 2.

The aforementioned solutions are employed with an acidic pH, i.e., a pH from 1.5 to about 4.0, preferably from 2 to 3. The dihydrogen orthophosphate solutes have a slightly acid pH when dissolved in an aqueous solution. Their pH, however, is lowered to the aforementioned values by the incorporation in the solution of a minor amount of a mineral acid such as sulfuric acid, phosphoric acid, nitric acid, or a hydrohalic acid, e.g., hydrochloric, hydrobromic, hydroiodic or hydrofluoric. Of the aforementioned acids, sulfuric and phosphoric are preferred. The mount of the mineral acid which is added to the solutions to lower the pH to the desired value can be from about 0.05 to about 5.0 weight percent, preferably from about 0.1 to about 2 weight percent.

The preferred use of the aforementioned solutions comprises the foliar application of the solutions to crops late in the growing season, e.g., at a period within about 20 to 45 days prior to the harvesting. The solutions can be applied in undiluted concentration or, if desired, can be admixed with from 0.1 to about 10 gallons of water per gallon of the aforementioned solution. The solutions are applied at a dosage sufficient to provide from about 0.01 to about 0.5 pound manganese per acre, preferably from about 0.1 to about 0.2 pound manganese per acre. In alternative applications, the solutions can be applied at the aforementioned dosages directly to the soil and can be applied at any time prior to or during the growing season of the particular crop. In such uses the solutions can be applied to correct known or suspected deficiencies of manganese in the soil before a manganese deficiency appears in the crops or can be applied to the soil whenever the manganese deficiency becomes apparent by an abnormal appearance of the crop.

The aforementioned solutions are compatible with most nutrient solutions and can be blended therewith in any desired proportion. Thus the aforementioned solutions can be blended with from about 1 to about 25 gallons per gallon of the solution of various nutrient solutions such as aqueous solutions of ammonium nitrate, urea, mixtures thereof, e.g., Uran, urea formaldehyde solutions such as UF–85, ammonium phosphate solutions, etc. The aqueous solutions can also be mixed with various suspensions of supersaturated solutions of the aforementioned nutrient solutes or suspensions of various fertilizer solids such as triple superphosphate, superphosphate, acidulated and pulverized phosphate rock, etc.

The following will illustrate various compositions encompassed within the invention:

TABLE

| Solution | Concentration, weight percent | | | | | | | |
|---|---|---|---|---|---|---|---|---|
| | $MnSO_4$ | $KH_2PO_4$ | $NH_4H_2PO_4$ | $H_2O$ | $NH_4NO_3$ | 8-24-0 | $(NH_4)_2SO_4$ | Urea |
| 1 | 5 | 25 | | 70 | | | | |
| 2 | 12 | 25 | | 63 | | | | |
| 3 | 3 | 29 | | 68 | | | | |
| 4 | 4 | 35 | | 61 | | | | |
| 5 | 15 | 25 | | 60 | | | | |
| 6 | 9 | 10 | | 71 | 10 | | | |
| 7 | 4 | 20 | | 61 | | 15 | | |
| 8 | 3 | 15.3 | | 61.7 | | | 20 | |
| 9 | 2 | 23 | 10 | 65 | | | | 10 |
| 10 | 7 | 20 | 10 | 63 | | | | |
| 11 | 5 | | 44 | 51 | | | | |
| 12 | 10 | | 25 | 65 | | | | |
| 13 | 12 | | 53 | 35 | | | | |
| 14 | 20 | | 25 | 55 | | | | |
| 15 | 10 | | 35 | 45 | 10 | | | |
| 16 | 15 | | 30 | 45 | | 10 | | |
| 17 | 12 | | 30 | 58 | | | | |
| 18 | 20 | | 20 | 50 | | | 10 | |
| 19 | 25 | 8 | 15 | 52 | | | | |
| 20 | 10 | | 30 | 45 | | | | 15 |

The aforementioned illustrative compositions are not intended to unduly limit the invention, but rather it is intended that all obvious equivalents to such compositions which are described herein or obvious equivalents of solutions described herein are within the scope of the invention.

I claim:

1. A eutectic solution having a salting out temperature no greater than 0° C. and comprising an aqueous solution of at least 1 weight percent manganese sulfate solute and at least 5 weight percent of a phosphorus solute selected from the class consisting of mono-potassium hydrogen orthophosphate and mono-ammonium hydrogen orthophosphate and a sufficient quantity of a mineral acid to impart to said solution a pH value of from 1.5 to about 4; the concentration of said solutes in said solution being greater than the additive concentrations of an aqueous solution saturated at 0° C. with said phosphorus solute and an aqueous solution saturated at 0° C. with said manganese solute.

2. A eutectic solution having a salting out temperature no greater than 0° C. and comprising an aqueous solution of manganese sulfate solute and mono-potassium hydrogen orthophosphate solute and a sufficient quantity of mineral acid to impart to said solution a pH of from 1.5 to about 4; said solution having a ternary concentration included within the area defined by lines A–B, B–C and C–A of FIG. 1 and the concentration of said solutes in said solution being greater than the additive concentration of an aqueous solution saturated at 0° C. with said phosphate solute and an aqueous solution saturated at 0° C. with said manganese solute.

3. A eutectic solution having a salting out temperature no greater than 20° C. and comprising an aqueous solution of manganese sulfate solute and mono-potassium hydrogen orthophosphate solute and a sufficient amount of mineral acid to impart to said solution a pH value from 1.5 to about 4; said solution having a ternary concentration included within the area defined by lines $A_1$–$B_1$, $B_1$–$C_1$ and $C_1$–$A_1$ of FIG. 1 and the concentration of said solute in said solution being greater than the additive concentration of an aqueous solution saturated at 0° C. with said phosphate solute and an aqueous solution saturated at 0° C. with said manganese solute.

4. An aqueous solution having a salting out temperature between 0° and 20° C. comprising from 1 to about 30 weight percent manganese sulfate solute, from 5 to about 39 weight percent mono-potassium hydrogen orthophosphate solute and from 56 to 74 weight percent water and a sufficient amount of a mineral acid to impart to said solution a pH from 1.5 to 4.0; the concentration of said solutes in said solution being greater than the additive concentration of an aqueous solution saturated at 0° C. with said phosphate solute and an aqueous solution saturated at 0° C. with said manganese solute.

5. A eutectic solution having a salting out temperature no greater than 0° C. and comprising an aqueous solution of manganese sulfate solute and mono-ammonium hydrogen orthophosphate solute and a sufficient quantity of a mineral acid to impart to said solution a pH value from 1.5 to about 4; said solution having a ternary concentration included within the area defined by lines A–B, B–C and C–A of FIG. 2 and the concentration of said solutes in said solution being greater than the additive concentration of an aqueous solution saturated at 0° C. with said phosphate solute and an aqueous solution saturated at 0° C. with said manganese solute.

6. An aqueous solution having a salting out temperature between 0° and 20° C. comprising from 1 to about 30 weight percent manganese sulfate solute, from 10 to about 58 weight percent mono-ammonium orthophosphate solute and from 34 to about 73 weight percent water and a sufficient amount of a mineral acid to impart to said solution a pH from 1.5 to 4.0; the concentration of said solutes in said solution being greater than the additive concentration of an aqueous solution saturated at 0° C. with said phosphate solute and an aqueous solution saturated at 0° C. with said manganese solute.

7. The solution defined in claim 1 wherein said eutectic solution consists essentially of said manganese solute, said phosphate solute and water.

8. The solution defined in claim 7 wherein said mineral acid is nitric, sulfuric, or phosphoric acid.

* * * * *